US009754114B2

(12) United States Patent
Singler

(10) Patent No.: US 9,754,114 B2
(45) Date of Patent: Sep. 5, 2017

(54) AUTOMATED CONTACT LIST MATCHING WITH IMPROVED PRIVACY

(71) Applicant: QNECTIVE AG, Zürich (CH)

(72) Inventor: Johannes Singler, Basel (CH)

(73) Assignee: QNECTIVE AG (CH)

( * ) Notice: Subject to any disclaimer, the term of this patent is extended or adjusted under 35 U.S.C. 154(b) by 13 days.

(21) Appl. No.: 14/777,354

(22) PCT Filed: Mar. 13, 2014

(86) PCT No.: PCT/IB2014/000308
§ 371 (c)(1),
(2) Date: Sep. 15, 2015

(87) PCT Pub. No.: WO2014/140736
PCT Pub. Date: Sep. 18, 2014

(65) Prior Publication Data

US 2016/0034692 A1 Feb. 4, 2016

(30) Foreign Application Priority Data

Mar. 15, 2013 (EP) .................................... 13001325

(51) Int. Cl.
*G06F 21/00* (2013.01)
*G06F 21/60* (2013.01)
(Continued)

(52) U.S. Cl.
CPC ........ *G06F 21/60* (2013.01); *G06F 17/30575* (2013.01); *G06F 21/6254* (2013.01); *H04L 63/0428* (2013.01); *H04L 67/1095* (2013.01)

(58) Field of Classification Search
CPC ................................ G06F 21/00; G06F 21/10
(Continued)

(56) References Cited

U.S. PATENT DOCUMENTS 7,685,296 B2 * 3/2010 Brill .................. G06F 17/30864 709/204
2005/0044059 A1 2/2005 Samar
2006/0080427 A1 4/2006 Yach et al.
2006/0236089 A1 10/2006 Cohen
2009/0083545 A1 3/2009 Heim et al.
2010/0257149 A1 10/2010 Cognigni et al.

FOREIGN PATENT DOCUMENTS

DE 10 2011 012444 A1 8/2012
EP 1 564 658 A1 8/2005
EP 2 506 177 A1 10/2012

OTHER PUBLICATIONS

International Search Report dated Jun. 5, 2014 issued in corresponding International patent application No. PCT/IB2014/000308.
(Continued)

*Primary Examiner* — Anthony Brown
(74) *Attorney, Agent, or Firm* — Ostrolenk Faber LLP

(57) ABSTRACT

A method and system for matching a first plurality of private data sets with a second plurality of data sets stored on a server-based communication system. A method including the steps of a) the server computer computing (216) a hash value length s representing the number of bits of a cryptographic hash value of a unique portion—e.g. the phone number—of each of the private data sets to be transmitted between client and server, and communicating s to the client, b) the server system receiving for each of the first plurality of private data sets a shortened hash value (28) from the client, preferably in an encrypted transmission channel, with a request to match the private data sets with the second plurality of data sets stored on the server, c) the server checking (238) if the length of the received hashes actually equals s, d) if the length of the hashes equals s, the server matching (240) each of the received hash values (28) to the second plurality of data sets stored on the server, finding the stored data sets having an identical shortened hash value, e) the server enlisting (245) each of the found hash values to a respective one of the received hash value (28), f) the server (Continued)

shortening (245) the found hash values to a predetermined length of m bits, and g) the server sending (250) for each of the received shortened hash values the list of m-bit shortened hash values (30) to the client device.

15 Claims, 4 Drawing Sheets

(51) Int. Cl.
*H04L 29/08* (2006.01)
*G06F 21/62* (2013.01)
*G06F 17/30* (2006.01)
*H04L 29/06* (2006.01)
(58) Field of Classification Search
USPC .................................................... 726/26–30
See application file for complete search history.

(56) References Cited

OTHER PUBLICATIONS

Response to European Search Report Mar. 4, 2015 in corresponding European patent application No. 13001325.3.
http://www.sueddeutsche.de/digital/2.220/schlechter-datenschutz-stiftung-warentest-warnt-vor-smartphone-apps-1.1365509 "Stiftung Warentest warnt vor Smartphone-Apps," vol. 6/12, published May 24, 2012. (with certified English translation—"Stiftung Warentest warns of Smartphone Apps") (6 total pages).
http://www.telemedicus.info/article/2222-LG-Berlin-Das-Facebook-Urteil-im-Detail.html "Telemedicus, Recht der Informationsgesellschaft," Mar. 12, 2012 (with certified English translation—"Telemedicus, Right of the Information Society") (14 total pages).

* cited by examiner 28 30

| *short hash* | *medium-sized hash* | *user reference* |
|---|---|---|
| 351e | 351e143cea42628d74c2 | John Doe |
| 5606 | 5606bc115f 28096379f 0 | Hans Mustermann |
| ⋮ | ⋮ | ⋮ |
| b86a | b86ac498f f e50a4bb198 | Beat Schweizer |

FIG. 4

AUTOMATED CONTACT LIST MATCHING WITH IMPROVED PRIVACY

CROSS REFERENCE TO RELATED APPLICATIONS

The present application is a 35 U.S.C. §371 National Phase conversion of PCT/EP2014/000308, filed Mar. 13, 2014, which claims benefit of European Application No. 13001325.3, filed Mar. 15, 2013, the disclosure of which is incorporated herein by reference. The PCT International Application was published in the English language.

1. BACKGROUND OF THE INVENTION 1.1. Field of the Invention

The present invention is in the field of information technology, and relates to method and system for matching a first plurality of private data sets such as a private contact book having typically a few hundred contact entries, stored in a communication client device, with a second plurality of data sets such as a large contact data repository having thousands or even millions of contact entries, stored on a server-based communication system.

1.2. Description and Disadvantages of Prior Art

Popular prior art communication services running on smartphones like WhatsApp use the user's GSM phone number as the user's identity. They provide services like text messaging, calling via Voice-over-IP, and file transfer, at low cost, by transferring the data over the phone's Internet connection. To display to the user the subset of his contacts that are also members of the same communication service, they match the user's contact book with the set of already registered members of the communication service.

So far, this is done in prior art by sending the list of phone numbers to the service provider in an unencrypted and non-anonymized fashion as reported in the journal of "Stiftung Warentest", volume 6/12, published May 24, 2012, receiving in reply the subset of contacts that are already members. Thus, anyone able to eavesdrop the communication between the phone and the service provider gets access to the user's full contact book. This includes the service provider themselves, of course. However, a contact book constitutes private data, and is a business secret for professionals, revealing valuable contacts and possibly even business strategies.

In order to be able to provide the requested service, e. g. to show the online status of contacts, the user's member contacts must be revealed to the provider of the service. This is permitted because those contacts have agreed to the terms and services of the communication service. In contrast, the contacts not participating in the communication service must not be revealed publicly, and not even to the provider of the communication service. In fact, this would be a breach of the right of informational self determination ("Grundrecht auf informationelle Selbstbestimmung") of the contact, who most likely has not agreed to their information being shared with such a service provider—as reported in http://www.telemedicus.info/article/2222-LG-Berlin-Das-Facebook-Urteil-im-Detail.html.

as published in the Internet since Mar. 12, 2012, or see the published decision of Landgericht Berlin, LG Berlin, Urteil v. Jun. 3, 2012, Az. 16 O 551/10.

A perfect way privacy-wise would be to asymmetrically encrypt the list of phone numbers entry by entry on both sides with a random and unique key, and to compare the encrypted lists. Since encryption is bijective, it is a bijection on the intersection operator, so the result can easily be transformed backwards by the client. However, encrypting all of a member's phone numbers for each matching is computationally unfeasible, since there could be millions, and multiple queries per second could occur.

Another way would be to send the full list of service participants to the client, and matching them there without further server interaction. However, this is also unfeasible because it would reveal the contact information of all members of the service to a non-trusted user. Even more so, the very long list of members would have to be sent to the client, resulting in possibly many megabytes of data, which is unfeasible particularly for mobile clients.

1.3. Objectives of the Invention

The objective of the present invention is to provide an efficient method and system for transmitting and matching such private data, as mentioned above wherein the data is processed such that any eavesdropping person including the central service provider who actually performs the matching, would have a too hard computational work to invest if he wanted to know about the data, and which method does not consume too much computational power at the client devices and the server.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to a basic feature of the present invention, a server-executed method for matching a first plurality of private data sets such as a private contact book stored in a communication client device with a second plurality of data sets such as a large contact data repository stored on said communication system is disclosed, comprising the steps of:

a) the server computer computing a hash value length s representing the number of bits of a cryptographic hash value of a unique portion—e.g. the phone number—of each of the private data sets to be transmitted between client and server, and communicating s to the client, b) the server system receiving for each of said first plurality of private data sets a shortened hash value from said client, preferably in an encrypted transmission channel, with a request to match said private data sets with the second plurality of data sets stored on the server, c) the server checking if the length of the received hashes actually equals s, d) if the length of the hashes equals s, the server matching each of the received hash values to the second plurality of data sets stored on the server, finding the stored data sets having an identical shortened hash value, e) the server enlisting each of said found hash values to a respective one of said received hash value,—e.g.: 10 hash values received, 23 matches found— f) the server shortening the found hash values, i.e. full hash values, to a predetermined length of m bits, and g) the server sending for each of the received shortened hash values the list of shortened hash values to the client device, as a response to the preceding request.

The processing of parameter s in step a) is a less important step, a kind of pre-processing. Parameter s can also be set manually or automatically in a general form or individually for each use case. Server and client computer make respective plausibility controls and agree to a specific value s unimportant which party proposed it—client or server, or they agree for a maximum allowed difference between s as sent from the server, and s, as sent from the client.

In step b) above, in case of address book collisions, i.e., when two different private data sets have accidentally the same hash value, then also only this single hash value is sent from the client to the server.

A cryptographic hash function like SHA-1 (prior art) projects each phone number to a bit string of a certain length, called the hash, e. g. 160 bits. A cryptographic hash function is a one-way function. So, determining the pre-image, i. e. the phone number from the hash, is computationally hard. It is generally assumed that the only way to get the pre-image of a hash is to try out most potential pre-images. In fact, it is expected to find a match after having tried half of them, but in the worst case, one has to try all. In the following, we will neglect this small constant factor of 2.

Shortening to length s in the sense of the present invention means to select an arbitrary but consistent ordered subset of length s of the hash. For example, the first (as shown in the drawings) or the last s bits could be selected, or arbitrary ones, like the 1st, 4th, 3rd, 21st bit and so on. How the subset is selected has no influence on the quality of the invention, since all bits have equal properties, which is a characteristic of a cryptographic hash function. The only condition is that server and client agree on the same subset, and that the two bits from the same bit position are compared to each other.

Steps a) and c) can also be replaced by an alternative method which yields usable control parameters for the inventional method.

As to step f), a second shortening can also be omitted, when the parameter m is set to the full length of the hash, e.g. 160 bits for SHA-1.

The inventional method can advantageously be applied, when private data sets are contact data stored in a mobile computing device such as a smart phone or a mobile telephone as the computational power on such devices is—although steadily growing—still quite limited.

When additionally, the server computer stores a pre-calculated, shortened hash value for each of the private data sets, which has been calculated with the same algorithm as used at the client computer, then no hash calculation has to be done "on the fly", i.e., when a contact matching request is received at the server. This saves time and allows short response times for such requests.

Also, the server computer advantageously calculates and stores a medium-length hash value of length m to send it back to the client for each matching data set.

Then, the client compares said medium-length hash value with the prefix of the full hash value, and for a matching pair, the client may easily compute the respective private dataset which has been matched by the server. Thus, such medium-sized hash value used at the server, also saves time and allows short response times for such matching requests.

When the server computer recomputes repeatedly the hash values based on a predetermined, preferably random-calculated input parameter, such as usually known as a "random salt", then some measure is found against the use of so-called rainbow tables by a potential attacker.

In an analogous form as disclosed for the server side, also for the client computing device, preferably a mobile device, a method is disclosed for matching a first plurality of private data sets such as a private contact book stored in a communication client device with a second plurality of data sets such as a large contact data repository stored on a server communication system, comprising the steps of:

a) the client device processing or computing a predetermined hash value length s representing the number of bits of a cryptographic hash value of a unique portion—e.g. the phone number—of each of the private data set to be transmitted between client and server, b) the client device computing the hash value for each of the private data sets, c) the client device shortening the hash value for each of the private data sets to a predetermined length s, d) the client device sending for each of the private data sets such shortened hash value to the server, preferably in an encrypted transmission channel, requesting the server to match the private data sets with the second plurality of data sets stored on the server, e) receiving a hash value for each match, which hash value has been shortened to a plurality of a predetermined number of m bits by the server, f) the client matching the received m-shortened hash values to the data sets stored at the client, thus revealing information for which private data sets stored both at the client, and at said server the respective unique portion is identical.

Advantageously, the client computing device iteratively applies the hash value calculation in a multiply repeated form in order to provide a higher degree of privacy.

The skilled reader recognizes that mathematically speaking, the matching problem solved here is to find the intersection of the relatively small set of contacts of a user's contact book with the relatively large set of a data repository storing a large plurality of contact data of registered members of a respective communication service, over a limited-bandwidth connection. The special requirement is to protect privacy. The contacts and the members are identified in this use case by their phone number in the internationally standardized and unique format, e. g. +4199999999.

Thus, a person skilled in the art will appreciate that an advantageous method and system is disclosed that offers a protocol for matching private data and in particular for matching the contact book with a contact data repository of a communication service, wherein the protocol does not reveal private information to neither the service provider nor any third party. So, the anonymity and privacy of the user's contacts is kept, and the contacts are not exposed to eavesdroppers.

According to a further advantageous optional feature, all hash values furthermore include a salt, i. e., resulting from a random, but constant bit string appended to the private data set—e.g. appended to the telephone number, or the name, or whatever part of the private data set, in clear form that deterministically changes the hash result. After predetermined time intervals the service provider recomputes all member hashes based on a new random salt, deprecating a potential hash reversal table (rainbow table) computed by a brute force attack. By telling the user to use this new salt for the contact matching, the service provider proves the high effort it would need to reverse-engineer the user's phone book, even for themselves.

Using this inventional method, it is not practically feasible for the service provider or any eavesdropper to reverse-engineer the contact book. Here, practically unfeasible means that it requires a prohibitive computational effort. And even if the eavesdropper would invest this effort, there is still an uncertainty if a reverse-engineered contact is truly a contact, e. g. 50%, depending on certain parameters, which can be set and modified by predetermined parameters adaptive to any individual use case.

Also, the anonymity and privacy of contacts that are not members of the communication service is preserved, as the non-participating contacts cannot accurately be known, not even by the service provider. The service provider knows only the contacts that are signed up for the service, i.e., who have accepted the terms and conditions of the service provider anyway.

So, an inventional method is disclosed including the technical feature of hashing the entries of the contact book and preventing brute force attacks by not transmitting the full hash but only a well-chosen part of it. This introduces uncertainty for any brute force attacks but maintains the expected hit rate to provide reliable contact matching. The parameters are chosen to optimize privacy vs. bandwidth requirements.

Nevertheless, the method and the respective system are efficient in terms of computations and communication even for a large number of members—for potentially all telephone numbers used on earth.

3. BRIEF DESCRIPTION OF THE DRAWINGS

The present invention is illustrated by way of example and is not limited by the shape of the figures of the drawings in which:

FIG. 4 is a schematic, comprehensive representation illustrating a shortened hash value, a medium-sized hash value and the clear user reference, here the name of a person, for three distinct contact book entries.

4. DETAILED DESCRIPTION OF THE PREFERRED EMBODIMENT

Figure 1:
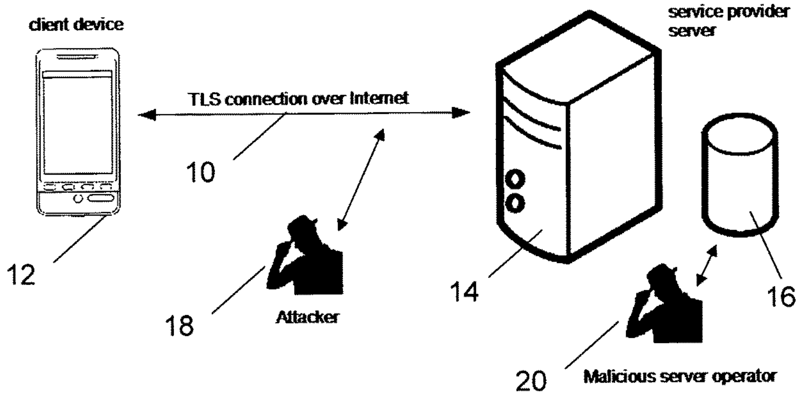
FIG. 1 is a schematic overview depiction of the system involved in the inventional method.

With general reference to the figures and with special reference now to FIG. 1 again, the inventional method is implemented in client-server architecture as represented in FIG. 1.

A client mobile smartphone device 12 is connected via an Internet connection 10 to a server computer 14 operated by a service provider. The server computer stores a large plurality of e.g. several millions of contact records in a large physical data repository, organized in an indexed database such as a relational database, wherein each dataset is associated with an individual person who has subscribed to the service before his contact data being stored. The contact data comprise one or more physical addresses of his seat, telephone numbers, e-mail addresses, and optionally further data like sex, age, profession, birthday, salary and further data possibly being relevant for marketing purposes, such as hobbies, interests, body size, etc. The client device and the server computer communicate with an encrypted connection via the Internet, such as the TLS protocol as known in prior art, or a additionally with a protocol, for example such as described in a copending European Patent Application No. 12007079.2 filed by the Applicant.

Further, an attacker person 19 is represented symbolically who tries to attack the communication during its way through the Internet, by prior art technical eavesdropping means.

Further, a second attacker is assumed to work at the service provider site, maybe a staff member, for example a malicious database operator 20 having read and/or write access to the data repository.

The inventional matching method is referred herein also as Private Contact Matching and is abbreviated as PCM. Let in this exemplary embodiment of the inventional method the "client" be the mobile computing device on which the user runs a communication application, such as "Facebook" or "Twitter", or "WhatsApp", implementing the inventional PCM method incorporated in a respective App. It communicates with the "server" of the communication service provider, implementing the counterpart PCM method, and thus interacting with the client.

Figure 2:
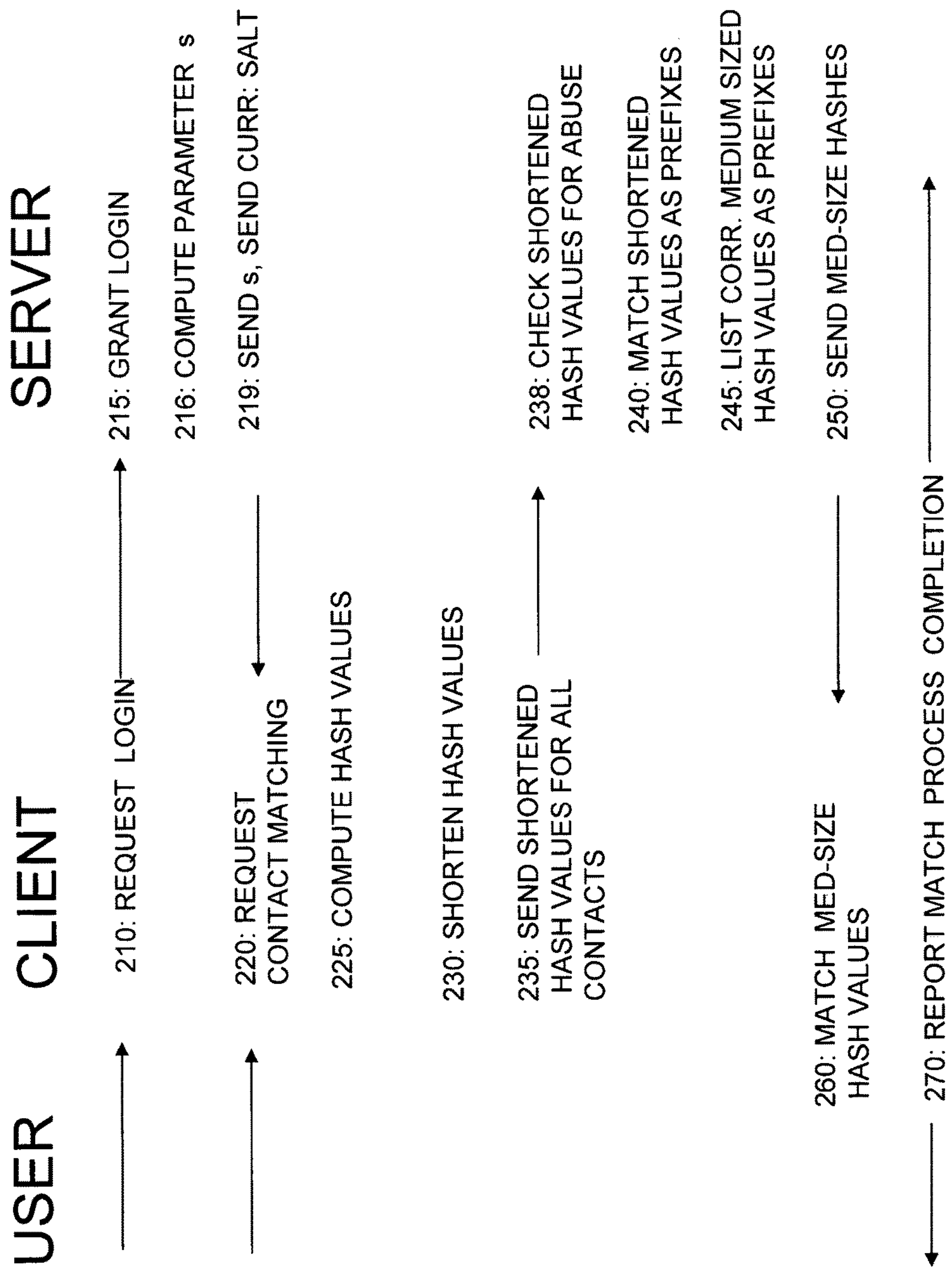
FIG. 2 is an interaction diagram illustrating the interaction between client and server during a preferred embodiment of the inventional method.

FIG. 2 is an interaction diagram illustrating the interaction between client 12 and server 14 during a preferred embodiment of the inventional method.

Figure 3:
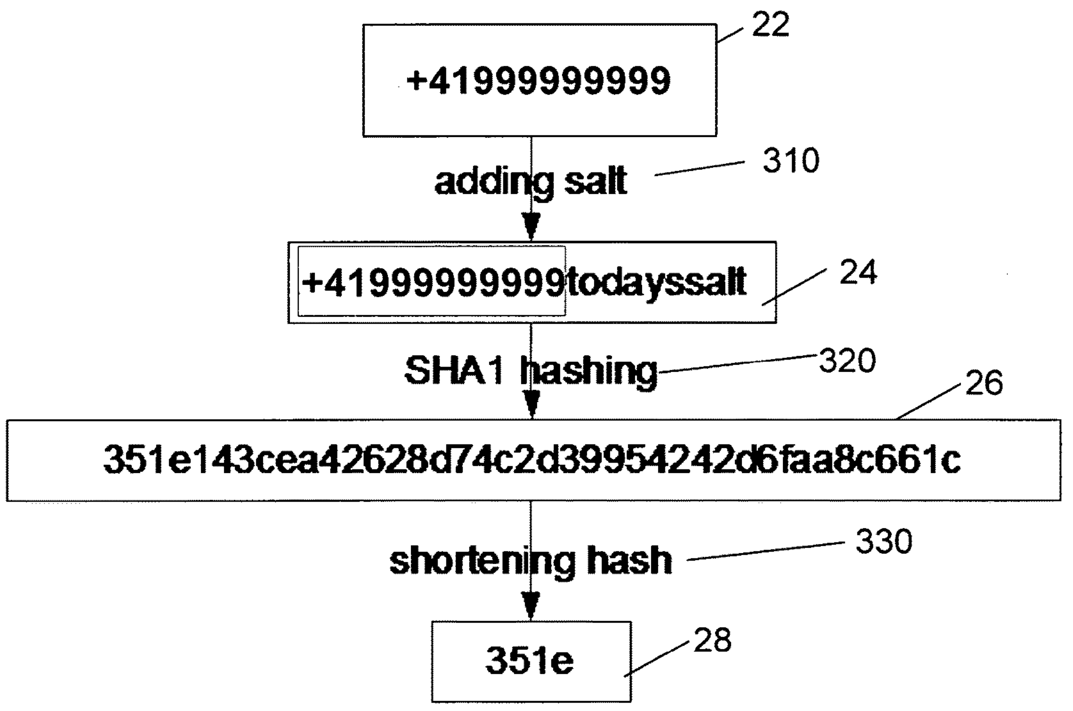
FIG. 3 is a zoom view on a detail of a step of FIG. 2, which is performed by the client.

FIG. 3 is a zoom view on a detail of a step 225 and 230 of FIG. 2, which is performed by the client.

As a first security measure, it is preferred to encrypt the Internet connection 10 between client and server using transport layer security referred to as TLS, as done in prior art. By verifying that the server certificate belongs to the service provider, it is ensured that only the known and desired service provider can listen to the communication at all, such that the protocol cannot easily be eavesdropped by a third party, such as attacker 18 in FIG. 1.

Secondly, according to a preferred feature of the present invention, the phone numbers 22 of the client contacts are not transmitted in plain text, but they will be processed using a specific cryptographic method, in particular, using a cryptographic hash function as known from prior art the MD-5 or SHA-1 function, in step 225 the inventional method projects each phone number to a bit string, called the hash (value), which is shortened in a step 230 and then transferred to the server in a step 235.

More particularly and preferably, before doing said before-mentioned steps 225 to 235, when logging in during client request step 210 and server login grant step 215, the server computes the value s=floor(log_2(n))−u as an indication of how many bits per contact should be sent in an eventual matching procedure in a step 216 and tells it in a step 219 to the client. The client receives said parameter s and checks whether this value is reasonably small. Alternatively, the client may decide which value s to use based on any other criteria.

Next, in a step 225 and with special additional reference to FIG. 3, for every contact in the contact book which is to be matched with the server's contact data repository, the client computes a cryptographic hash value of the phone number 22. Preferably, and exemplarily, the SHA-1 algorithm is used and a salt is added in a step 310 before applying the hash function to the salt-added phone number 24 in a step 320. Preferably, hashing is repeated a large number of times, for example 1000 times (not depicted in the drawing); the more times, the harder it is (directly proportional) to compute the pre-image of the hash value.

Third, the hash values of the address book's phone numbers are shortened to a certain number of bits in a further step 330, resulting in a shortened hash value 28, in order to introduce uncertainty in case that the attacker applies brute force.

With reference to the special problems of this inventional use, only the service provider can attack because of the secure TLS transmission, but it should be noted that the contacts not being members at the server data repository should not be matched, or even be exposed to the service provider.

Given that the communication service has n, say exemplarily n=10.000.000 members. Let L=log_2(n), thus L=23, xxx. Comparing L bits of hashes, a random hash expectedly matches about 1 contact. The client cuts the hashes in a step 330 to s=floor(L)−u bits, where u is a predetermined, user-settable parameter. The larger u, the greater is the uncertainty, as more members not being contacts are expected to match the shortened hash. Let us assume u=1, then s=floor(23,xxx−1)=floor(22,xxx)=22=s. Thus the client shortens the hash value from e.g. 160 bits (in case of using SHA-1) to 22 bits, resulting in a shortened hash value denoted with reference sign 28 in FIG. 3. Then the client sends the list of shortened hashes to the server through the TLS-encrypted connection, see step 235 in FIG. 2.

After receiving said shortened hash values, in order to avoid exposing the phone numbers of too many false positive hash collisions, the server PCM program checks whether the length s of the shortened hashes is long enough as requested, and checks in a step 238, whether the number of sent hash values is not implausibly large, to avoid to reveal an inadequately large part of the contact data member set to the client. In this sense, it is proposed to define a maximum limit of the number of hashes sent to the client to 5000, as a maximum potential size for the contact book.

Then, the server matches the received shortened hashes to the members of its system data repository, in a step 240. More particularly, the server finds the members for which the prefix of the hash of the phone number matches one of the received short hashes, by a respective compare process. For every match, in a step 245, the server enlists the corresponding hash value in a preferably longer, say medium-size length m of e.g. 64 bits, of the same kind, which make the match results highly likely to be exact, but still necessitate a high computational effort for decrypting and revealing the matching pre-image phone numbers.

Then, as the response to the matching request, instead of sending back plain text phone numbers the server sends back said medium-size, longer (say m=64 bits) hash values to the client, step 250.

After the client received said medium-size hash values, in a step 260 the client matches the received medium-sized hash values to the own contact data, i.e. it finds the contacts for which the prefix of the hash of the phone number matches one of the received medium-sized hashes. Every match is a contact that is also a member of the communication service, forming the resulting intersection of sets. Then the client displays to its user that the matching process has been successfully completed, step 270.

In order to answer the matching queries efficiently, the server preferably keeps the short hash value with every member dataset in an indexed form in the database, so no hash values have to be computed on-the-fly. Also, the medium-sized hash value for the result is preferably stored in the database, for quick construction of the answer.

FIG. 4 is a schematic, comprehensive table representation illustrating in a left column a shortened hash value denoted in exemplary hexadecimal code and corresponding to 16 bits, in the central column a medium-sized hash value in exemplary hexadecimal code corresponding to 64 bits, and in the right column the clear user reference, here the name of a person, for three distinct address book entries. Identical bit strings of the hashes are denoted within the circles in broken lines.

In a preferred efficient implementation of the server part system, the server keeps associated with every member of the contact data repository the short hash and the medium-sized hash, incorporating the current salt. It stores the short hash in hex format, so that an efficient indexed search can be performed. If the number of bits is not divisible by four, O-bits are padded both to the short hash and to the query.

In order to allow changing the hash properties like the length and the salt while continuing service, the time-consuming recalculation has to be done in the background. To this end, the server keeps two copies of the table. While one of them is actively used, the other one can be recomputed using new parameters in the background. When the computation is finished, the server swaps both tables, and starts communicating the new parameters to the clients.

Further, a short proof of effectiveness of the inventional method as described above is given next below, along with further improvements thereof:

The connection between client and server is encrypted and authenticated using a server certificate well-known by the client. The client is not authenticated to the server, since it is assumed that the service is open to the public anyway. Intercepting the encrypted communication would require write access to the client, to install a falsified or manipulated version of the client software. Given this assumption, the attacker could easily just read out the contact book in plain text directly from the client phone, and send it to the attacking party. So we can assume that the connection is secure.

Still, the communication service provider can read the full communication, and the staff there cannot be regarded as fully trustworthy because of the privacy regulations mentioned in the introductory chapter. On the other hand, the communication service provider can prove its privacy credibility to the public by using the inventional method. So the skilled reader appreciates that even the service provider could reconstruct the contact book only with some extreme effort, and still only with a significant degree of uncertainty, as justified in the following.

We estimate to exist about 10^12 (a trillion) phone numbers world-wide (including country codes). Even though the actual set of phone numbers in the world is in fact much smaller, there is no complete publicly available machine-readable listing that could be of help. Since the inventional method preferably iteratively applies the hash function in the order of magnitude 10^3 times, attacking the contact book requires a computational effort of about 10^15 (1000 trillions) hash computations, which is very expensive even for large computers. For the client, computing the hashes requires quite some computation power, but this is acceptable (10^6, a million hash computations for 1000 contacts), since this can happen in the background. As computational power of mobile devices increases generally with time—on both, clients and machines available to the attacker—the number of iterations can be raised.

For the before mentioned parameter u=0, the expected hit rate for each hash is 1, for u>0, it is 2^u (i.e. 2 exp u). The drawback is that the larger u, the returned list of results grows, and so do the bandwidth requirements. Thus, selecting a value for u is a compromise between privacy and bandwidth requirements. A preferred value is u=1, so the probability that a suspected contact actually is a contact, is 50%.

In addition, the number of bits sent to the server in the inventional method will asymptotically be less than the bit entropy contained by the contact book, so an independent party is given a hint that the contact book is not just sent entirely, by knowing only the length of the encrypted message.

For example, for n=10^6 and u=1, an inventional embodiment would send only 18 bits per contact, which is equivalent to about 6 decimal digits, which is even shorter than the usual individual part of the phone number (i. e. excluding the country and area code).

Since the hashes sent by the client are designed to incur hash collisions, the service provider reveals some non-contact members to the client, as medium-size hashes. Again, computing the pre-image is still constrained with prohibitive effort, and even if that effort is invested, the client gets to know random members only. It is however possible to check whether there is a member with a specific phone number, since it could be easily added to the contact book of the interested party, and that party could become a member. After all, exposing to a member that a contact is also a member of the service, is the original purpose of the whole inventional system.

The inventional method and system can be modified and extended in various ways:

The inventional Private Contact Matching method is also advantageous when used with stationary devices with a higher bandwidth Internet connection. The disadvantageous alternative, as mentioned in the introductory chapter, to transfer the whole set of communication service members, is still unfeasible in this case, since it would incur lots of traffic unexpected by the user. Due to a higher computational power being available in this environment, the number of hash iterations could be increased for even better privacy.

Further, in case the server wants to provide multiple levels of privacy using different parameter sets, trading off computing performance and bandwidth, the server can just keep multiple parameter sets having the respective degree of trade-off as mentioned above.

The inventional method can also be used with contact identification means other than the before-mentioned phone numbers, e. g. email addresses. It functions even better, since the universe of possible email addresses is much larger by number, and is easier to administrate due to absence of analogous communication interfaces than the universe of phone numbers. So, attacks are even less likely to be successful.

While in the above description, a user is usually identified by a single phone number, the inventional method can also be varied to support multiple phone numbers per contact. The different phone numbers are then just treated as individual contacts, which is also useful to reach the recipient on the desired device (e. g. phone at work versus phone at home).

In order to further obfuscate the client contact book, the client may add randomly generated virtual contacts, i.e. respective data sets, behind which no physical person is present, and include the respective hashes in the matching request. However, this does not add much over further truncating the hashes instead, except that it is out of the influence of the service provider.

While the before-mentioned feature is tainted with uncertainty for the service provider that a contact match is actually a real contact on the user's phone, it is possible to tell with high probability whether an a-priori-suspected contact is actually a contact of a client, after executing the inventional method, because it is a-posteriori unlikely that another contact of the user produces the same short hash.

To make a coincidental match more likely, it is proposed according to a further inventional feature to either choose a larger parameter u, i.e. accepting more traffic, or make the hash function preserve a larger part of the original information, e. g. combining the first some digits of the phone number (country and area code, which are likely to reappear, and do not include private information) with a correspondingly shorter hash of the phone number. This effectively enlarges said parameter u further.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

Permanent storage hardware resources mentioned herein, such as hard disk drives, or optical, or magneto-optical devices such as Compact Discs, or Digital Versatile Disks (DVD), Flash ROM devices, are in general inter-changeable in use, unless specified explicitly differently. So, for most storage purposes a permanent, non-volatile storage device such as mentioned before can be used, when the computer system in question has no special dedication or relation to be used as a hand-held or pocket-compliant system. Then of course in absence of a hard disk drive a FLASH-ROM storage device is preferred.

Volatile Memory is generally used for temporarily storing programs or data, and in particular for loading programs or program submodules, and for the immediate data exchange with the Central Processing Unit (CPU) of a computer.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

LIST OF REFERENCE SIGNS

10 Internet connection
12 mobile client device
14 service provider server computer
16 data repository
18 attacker within the Internet
20 malicious server operator
22 phone number of client
24 salt added phone number
26 hash value of 24
28 shortened hash value of 26
30 medium sized hash of 26
210 to 330: steps of the inventional method

What is claimed is:

1. A method for matching a first plurality of private data sets stored in a communication client device with a second plurality of data sets stored on a server communication system, comprising the steps of:

a) the server communication system computing a hash value length s representing a number of bits of a cryptographic hash value of a unique portion of each of the private data sets to be transmitted between the communication client device and the server communication system, and the server communication system communicating s to the communication client device, b) the server communication system receiving for each of the first plurality of private data sets a shortened hash value from the communication client device along with a request to match the private data sets with the second plurality of data sets stored on the server communication system, c) the server communication system checking if the length of the received shortened hash values actually equals s, d) if the length of the shortened hash values equals s, the server communication system matching each of the received shortened hash values to the second plurality of data sets stored on the server communication system, the server communication system finding the stored data sets having an identical shortened hash value, e) the server communication system enlisting each of the found stored data sets having the identical shortened hash value to a respective one of the received hash value, f) the server communication system shortening the found stored data sets having the identical shortened hash value to a predetermined length of m bits, and g) the server communication system sending for each of the received shortened hash values a list of m-bit shortened hash values to the communication client device.

2. The method according to claim 1, wherein the private data sets are contact data of users stored in a mobile computing device.

3. The method according to claim 1, wherein the server communication system determining the hash value length value s representing the number of bits of a cryptographic hash value of a unique portion of each of said private data sets to be transmitted to the communication client device, and transmitting said hash value length value s to the communication client device.

4. The method according to claim 1, wherein the server communication system stores a pre-calculated, shortened hash value associated with a respective private data set.

5. The method according to claim 1, wherein the server communication system calculates and stores a longer hash value than the received hash value associated with a respective private data set and sends the longer hash value back to the communication client device for each matching data set.

6. The method according to claim 1, wherein the server communication system recomputes the shortened hash values based on a predetermined random-calculated input parameter.

7. A method for matching a first plurality of private data sets stored in a communication client device with a second plurality of data sets stored on a server communication system, comprising the steps of:

a) the communication client device processing or computing a predetermined hash value length s representing a number of bits of a cryptographic hash value of a unique portion of each of the private data sets to be transmitted between the communication client device and server communication system, b) the client device shortening the cryptographic hash value for each of the private data sets to a predetermined length s, c) the communication client device sending for each of the private data sets the shortened hash value to the server communication system, requesting the server communication system to match the private data sets with the second plurality of data sets stored on the server communication system, d) the communication client device receiving a hash value for each match, which hash value has been shortened to a plurality of a predetermined number of m bits by the server communication system, e) the communication client device matching the received m-shortened hash values to the data sets stored at the communication client device, thus revealing information for which private data sets stored both at the communication client device and at the server communication system the respective unique portion is identical.

8. The method according to claim 7, wherein the communication client device iteratively applies the hash value calculation in a multiply repeated form.

9. A computer system, comprising:

a memory and a processor for performing a method for matching a first plurality of private data sets stored in a communication client device with a second plurality of data sets stored on a server communication system, comprising the steps of:

a) the server communication system computing a hash value length s representing a number of bits of a cryptographic hash value of a unique portion of each of the private data sets to be transmitted between the communication client device and the server communication system, and the server communication system communicating s to the communication client device, b) the server communication system receiving for each of the first plurality of private data sets a shortened hash value from the communication client device along with a request to match the private data sets with the second plurality of data sets stored on the server communication system, c) the server communication system checking if the length of the received shortened hash values actually equals s, d) if the length of the shortened hash values equals s, the server communication system matching each of the received shortened hash values to the second plurality of data sets stored on the server communication system, the server communication system finding the stored data sets having an identical shortened hash value, e) the server communication system enlisting each of the found stored data sets having the identical shortened hash value to a respective one of the received hash value, f) the server communication system shortening the found stored data sets having the identical shortened hash value to a predetermined length of m bits, and g) the server communication system sending for each of the received shortened hash values a list of m-bit shortened hash values to the communication client device.

10. A non-transitory computer-readable medium comprising a server computer program for execution in a server data processing system, implementable in a client-server network, for matching a first plurality of private data sets such as a private contact book stored in a communication client device with a second plurality of data sets such as a large contact data repository stored on a server communication system, comprising instructions stored thereon for causing a computer to perform a method for matching a first plurality of private data sets stored in a communication client device with a second plurality of data sets stored on a server communication system, comprising the steps of:

a) the server communication system computing a hash value length s representing a number of bits of a cryptographic hash value of a unique portion of each of the private data sets to be transmitted between the communication client device and the server communication system, and the server communication system communicating s to the communication client device, b) the server communication system receiving for each of the first plurality of private data sets a shortened hash value from the communication client device along with a request to match the private data sets with the second plurality of data sets stored on the server communication system, c) the server communication system checking if the length of the received shortened hash values actually equals s, d) if the length of the shortened hash values equals s, the server communication system matching each of the received shortened hash values to the second plurality of data sets stored on the server communication system, the server communication system finding the stored data sets having an identical shortened hash value, e) the server communication system enlisting each of the found stored data sets having the identical shortened hash value to a respective one of the received hash value, f) the server communication system shortening the found stored data sets having the identical shortened hash value to a predetermined length of m bits, and g) the server communication system sending for each of the received shortened hash values a list of m-bit shortened hash values to the communication client device, when said computer program is executed on a processor on the computer.

11. A non-transitory computer-readable medium comprising a client computer program for execution in a client data processing system, implementable in a client-server network, for matching a first plurality of private data sets such as a private contact book stored in a communication client device with a second plurality of data sets such as a large contact data repository stored on a server communication system, having instructions stored thereon for executing a method for matching a first plurality of private data sets stored in a communication client device with a second plurality of data sets stored on a server communication system, comprising the steps of:

a) the communication client device processing or computing a predetermined hash value length s representing a number of bits of a cryptographic hash value of a unique portion of each of the private data sets to be transmitted between the communication client device and server communication system, b) the client device shortening the cryptographic hash value for each of the private data sets to a predetermined length s, c) the communication client device sending for each of the private data sets the shortened hash value to the server communication system, requesting the server communication system to match the private data sets with the second plurality of data sets stored on the server communication system, d) the communication client device receiving a hash value for each match, which hash value has been shortened to a plurality of a predetermined number of m bits by the server communication system, e) the communication client device matching the received m-shortened hash values to the data sets stored at the communication client device, thus revealing information for which private data sets stored both at the communication client device and at the server communication system the respective unique portion is identical, when said computer program is executed on a processor on a client computer.

12. The method of claim 1, wherein the private data sets comprises a private contact book and the second plurality of data sets comprises a large contact data repository.

13. The method of claim 1, wherein the communication between the communication client device and the server communication system occurs in an encrypted transmission channel.

14. The method of claim 7, wherein the private data sets comprises a private contact book and the second plurality of data sets comprises a large contact data repository.

15. The method of claim 7, wherein the communication between the communication client device and the server communication system occurs in an encrypted transmission channel.

* * * * *